United States Patent [19]

Maekawa et al.

[11] Patent Number: 5,005,797
[45] Date of Patent: Apr. 9, 1991

[54] DOOR MIRROR FOR VEHICLES

[75] Inventors: Masashi Maekawa, Atsugi; Kunio Kotani, Isehara; Ryoji Ukaji, Sagamihara; Hiroshi Shimizu, Takasaki; Kenichi Sato, Isehara, all of Japan

[73] Assignee: Ichikoh Industries, Ltd., Tokyo, Japan

[21] Appl. No.: 330,085

[22] PCT Filed: Jul. 16, 1988

[86] PCT No.: PCT/JP88/00709
§ 371 Date: Mar. 15, 1989
§ 102(e) Date: Mar. 15, 1989

[87] PCT Pub. No.: WO89/00518
PCT Pub. Date: Jan. 26, 1989

[30] Foreign Application Priority Data

| Jul. 16, 1987 | [JP] | Japan | 62-108313[U] |
| Mar. 14, 1988 | [JP] | Japan | 63-32596[U] |
| Mar. 25, 1988 | [JP] | Japan | 63-38486[U] |
| Mar. 25, 1988 | [JP] | Japan | 63-38487[U] |
| Mar. 28, 1988 | [JP] | Japan | 63-39591[U] |
| Apr. 5, 1988 | [JP] | Japan | 63-45301[U] |

[51] Int. Cl.$^5$ .............................................. A47G 1/24
[52] U.S. Cl. .................. 248/479; 248/289.1; 248/900
[58] Field of Search ............... 248/900, 549, 485, 486, 248/487, 479, 285, 282, 289.3, 289.1; 350/637, 636, 639, 631, 604, 634

[56] References Cited

U.S. PATENT DOCUMENTS

| 4,466,594 | 8/1984 | Sharp | 248/900 X |
| 4,606,619 | 8/1986 | Yamana | 248/549 X |
| 4,626,083 | 12/1986 | Nakayama | 350/604 |
| 4,626,084 | 12/1986 | Kumai | 350/604 |
| 4,789,232 | 12/1988 | Urbanek | 350/632 |
| 4,832,477 | 5/1989 | Torii | 248/900 X |

FOREIGN PATENT DOCUMENTS

2408716 9/1975 Fed. Rep. of Germany ...... 248/900

Primary Examiner—J. Franklin Foss
Attorney, Agent, or Firm—Foley & Lardner, Schwartz, Jeffery, Schwaab, Mack, Blumenthal & Evans

[57] ABSTRACT

The door mirror according to the present invention is a so-called tiltable door mirror for vehicles. The bearing member to bear the shaft of the mirror base which is to be fixed to the vehicle door is formed integrally with the synthetic resin-made mirror housing. The bearing member is formed as a bearing cylinder inside the mirror housing. Being in contact with the bearing surface of the bearing cylinder, the shaft pivotably supports the mirror housing. There is provided between the inner wall of the bearing cylinder and the shaft a U-shaped leaf spring which is in contact at the one end thereof with the inner wall of the bearing cylinder and at the other end with the flat surface formed at a part of the shaft, whereby the friction generated under the action of the leaf spring helps to block the mirror housing from pivoting and thus the mirror housing can be held in the normal position. The shaft has disposed at the end thereof a stopper to prevent the mirror housing from moving axially of the shaft. When a big external force is applied to the mirror housing, the portion of contact between the leaf spring and the shaft moves from the flat surface to the circumferential surface against the force of the leaf spring, so that the mirror housing is pivoted slowly from the normal position to a front or rear position with respect to the normal position. The door mirror of the present invention consists of a reduced number of elements and has a simplified structure. Furthermore, since it can be installed very easily, the manufacturing costs can be reduced very much.

5 Claims, 13 Drawing Sheets

DOOR MIRROR FOR VEHICLES

FIELD OF THE INVENTION

The present invention relates to a door mirror for vehicles for the driver to obtain a rear view, and more particularly to an improved and novel mirror housing supporting structure in a tiltable door mirror.

BACKGROUND ART

Figure 1:
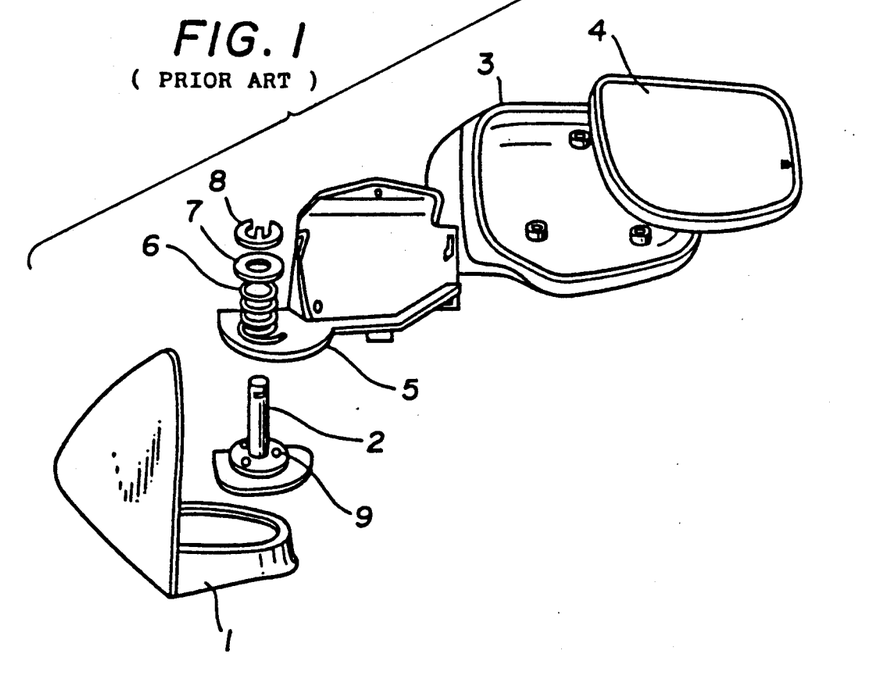
FIG. 1 is a perspective exploded view schematically showing the construction of the conventional tiltable door mirror.
Figure 2:
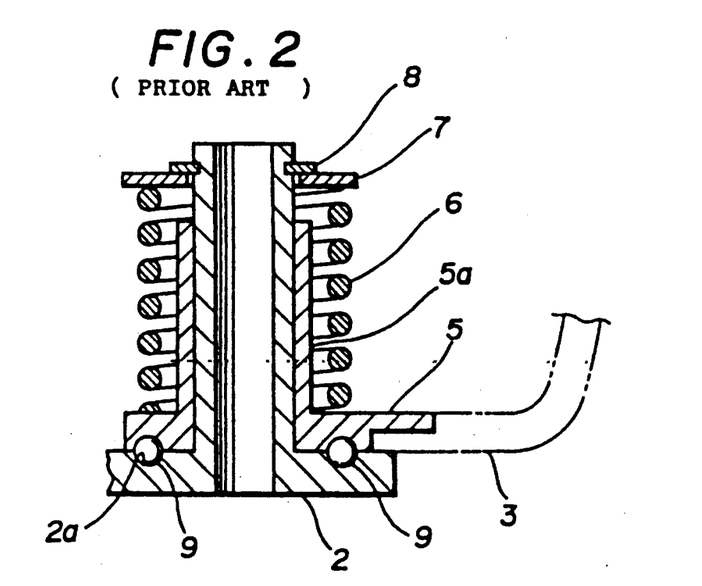
FIG. 2 is a sectional view showing the essential portion in FIG. 1.

In general door mirrors for vehicles, a mirror housing tiltably supporting a mirror is fixed on the door of the vehicle as projected therefrom. Nowadays, however, door mirrors of such a structure that the mirror housing itself is pivotable with respect to the mirror base are proposed and used in place of door mirrors having such a fixed mirror housing. A typical tiltable door mirror is disclosed in the Japanese Unexamined Utility Model Publication No. 61-190742, for example, as shown in FIG. 1. The disclosed door mirror has a mirror base 1 which is to be fixed on a vehicle door and on which a substantially vertical shaft 2 is fixed, and a mirror housing 3 having fixed thereon a bracket 5 on which there is installed a drive unit (not shown) for tilting a mirror body on which a mirror 4 is fixed. As shown in FIG. 2, the bracket 5 has formed integrally therewith a bearing cylindrical portion 5a which supports the shaft 2. There is disposed a compression coil spring 6 between the base of the bearing cylindrical portion 5a and a spring receiver 7 of which the outward movement from the shaft 2 is limited by a cir-clip 8 fixed on the end of the shaft 2. Also there is disposed a plurality of balls 9 between the bottom of the bracket 5 and the base of shaft 2. The balls 9 are housed in a concavity 2a formed in the base of the shaft 2, and since the bracket 5 is forced toward the base of the shaft 2 under the action of the coil spring 6, the mirror housing 3 is positioned in the normal position. When applied with a large external force, the mirror housing 3 is pivoted a predetermined angle against the force of the coil spring 6.

In the conventional tiltable door mirror of such type, the mirror housing 3 is made of a lightweight synthetic resin while the bracket 5 including the bearing cylindrical portion 5a is made of a metal, for example, aluminum die-casting, which will provide a large mechanical strength. Since both these members are mechanically coupled to each other, they will exhibit a high combined weight weight as totaled. As aforementioned, the compression coil spring 6 for forcing the bracket 5 to the base of the shaft 2 is disposed between the base of the bearing cylindrical portion 5a and the spring receiver 7, and the plurality of balls 9 is disposed between the bottom of the bracket 5 and the base of the shaft 2, in order to provice a stepwise movement of the mirror housing 3. Therefore, the support structure for the mirror housing 3 is complicated and requires a high skill of the worker who installs the door mirror to the door of a vehicle. Also, because of the support structure, the door mirror of such support structure cannot be easily installed in a short time.

The present invention has an object to overcome the above-mentioned drawbacks of the conventional tiltable door mirrors by providing a door mirror having an improved and novel mirror housing supporting structure.

The present invention has another object to provide a door mirror having a mirror housing supporting structure which consists of a reduced number of parts, is lightweight, and has a high mechanical strength.

The present invention has a still another object to provide a door mirror having a simple mirror housing supporting structure and which can be installed rapidly and easily.

DISCLOSURE OF THE INVENTION

The door mirror according to the present invention comprises a mirror base to be fixed to the door of a vehicle and which has a substantially vertical shaft, synthetic resin-made mirror housing tiltably supporting a mirror and pivotably supported on a shaft of the mirror base, and a spring means which forces the mirror housing to the mirror base to maintain the mirror housing in the normal position, the mirror housing being pivotable from the normal position to a front or rear position with respect to the normal position when applied with an external force larger than a predetermined force corresponding to the elasticity of the spring means, the mirror housing having formed by an integral molding therein a bearing member which bears the shaft of the mirror base.

Since the synthetic resin-made mirror housing and the bearing member which bears the mirror base shaft are formed together by the integral molding, their weight is extremely small and the mirror housing supporting structure is very simple, which facilitates very much the installation of the door mirror.

The bearing member may be composed of a hollow inner cylindrical portion having formed thereon a bearing surface to bear the circumferential surface of the shaft, an outer cylindrical portion formed integrally with the inner cylindrical portion and opened at the lower end thereof, and a plurality of reinforcing ribs coupling the inner and outer cylindrical portions to each other and disposed radially, the end of the shaft being so constructed as to be inserted from a lower opening of the inner cylindrical portion and exposed outside of an upper opening thereof, the upper wall of the outer cylindrical portion being formed to have a flat surface substantially perpendicular to the shaft, the spring means being constructed in the form of a compression coil spring interposed between a spring receiving member fixed at the shaft end and the flat surface, whereby the bearing member can have an ample rigidity.

There may be interposed between the mirror housing and mirror base spherical members pivotably supporting the mirror housing around the shaft, the spherical members including three balls disposed in spaces defined by three small semispherical concavities formed on the mirror base and three essentially semispherical concavities formed concentrically at each end of the reinforcing rib, the small semispherical concavities on the mirror base being provided corresponding to the normal position of the mirror housing and to front and rear positions with respect to the normal position.

Also, the shaft may be formed separately from or integrally with the mirror base. In case it is formed integrally with the mirror base, the door mirror can be easily installed on the car.

The bearing member may be formed by a bearing having a bearing surface to bear the circumferential surface of the shaft, the spring means being formed by a U-shaped leaf spring housed in the bearing, the leaf spring being so disposed as to be in contact, at the one end thereof, with the inner wall and at the outer wall with a flat surface formed at least a portion of the shaft and which is parallel to the axis of the shaft, a stopper being disposed at the end of the shaft to limit the axial movement of the mirror housing.

Since the leaf spring forces the circumferential surface of the shaft in a direction perpendicular to the axis, the circumferential surface is in close contact with the bearing surface of the bearing so that the frictional force helps to restrain the mirror housing including the bearing from pivoting about the shaft. Besides, since the leaf spring is disposed as housed in the bearing, it is easy to install the shaft in the bearing, and also since the mirror housing supporting structure can be designed to be compact, the stopper provided at the shaft end is not applied with any large stress so that the shaft will not be damaged. When the mirror housing is in the normal position, the leaf spring abuts the flat surface formed on the shaft, but when the mirror housing is applied with a large external force, the leaf spring shrinks and moves from the flat surface of the shaft to the circumferential surface and into contact with the latter, so that a part of the large external force applied to the mirror housing is absorbed and the mirror housing pivots slowly.

The leaf spring may be a pair of leaf springs which are provided opposite to each other around the shaft inside the bearing, the shaft being provided with a pair of fat surfaces receiving the leaf springs, respectively, whereby the mirror housing is more stably supported and maintained in the normal position.

These flat surfaces should preferably be formed by D-cut portions which are formed on the circumferential surface of the shaft.

The leaf spring has formed thereon a portion protruded toward the flat surface on the shaft, the flat surface having formed therein a concavity in which the protrusion is engaged, whereby the mirror housing can be more stably supported and maintained in the norma position.

The outer circumferential surface of the shaft corresponding to the path on which the protrusion is moved as the mirror housing is pivoted has formed therein two concavities, in addition to the above-mentioned concavity, in which the protrusion is also engaged; the first concavity corresponding to the normal position of the mirror housing while the second concavities correspond to the front and rear positions, respectively, with respect to the normal position of the mirror housing. Thereby, the mirror housing can be positively maintained in the normal position and pivoted stepwisely.

The shaft is formed at a portion near the lower end thereof to have a large diameter and at a portion near the upper end to have a small diameter. The portion between these large- and small-diameter cylindrical surfaces is formed to have a conical surface of which a part may be formed to be parallel to the axis of the shaft. Furthermore, the bearing may be formed to have bearing surfaces which bear the large- and small-diameter cylindrical surfaces and the conical surface, respectively. Thereby, it is easier to install the shaft into the bearing.

The stopper may be formed by a pair of pawls formed at the end of the shaft, the end of the shaft inserted from the lower opening of the bearing preferably being engaged on the edge of the upper opening of the bearing when the shaft end is exposed from the upper opening of the bearing.

The spring means may be formed by an elastic member, instead of the leaf spring, wrapped with a lubricating synthetic resin and which is disposed in a pocket area defined by a concavity formed in a portion of the conical surface of the shaft and a concavity formed opposite to that concavity inside the bearing.

DETAILED DESCRIPTION OF THE PREFERRED EMBODIMENTS

Figure 3:
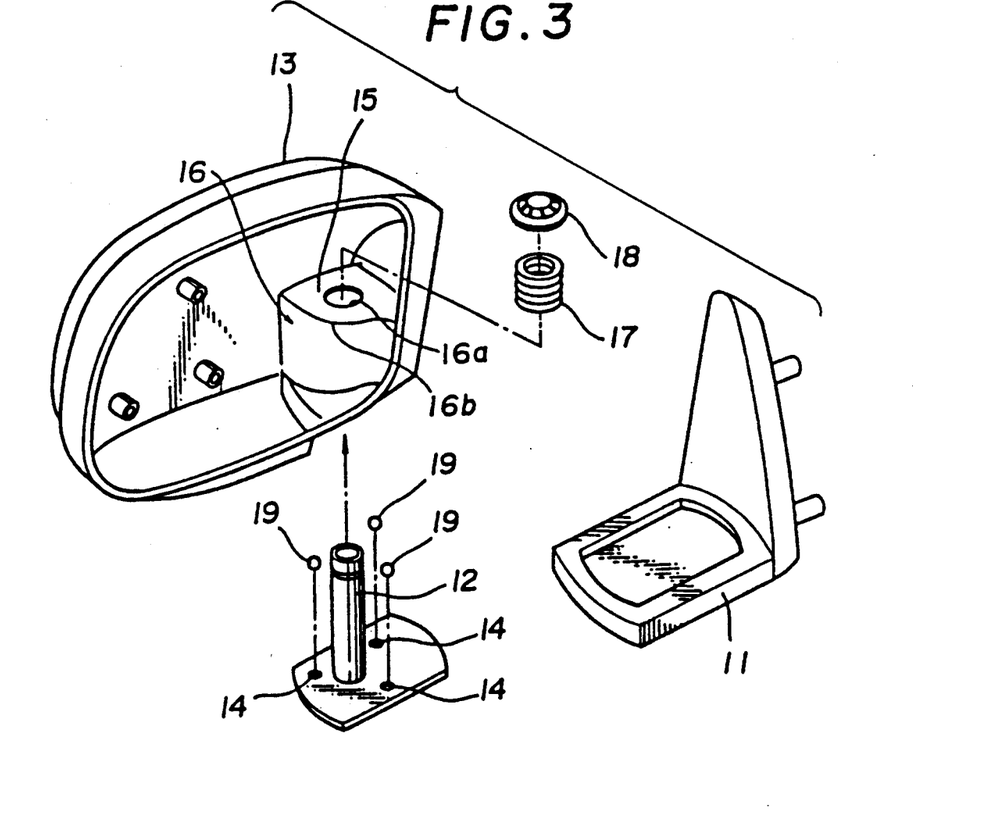
FIGS. 3 through 5 show a first embodiment of the door mirror according to the present invention; of which FIG. 3 being a perspective exploded view schematically showing the construction of the door mirror, FIG. 4 being a bottom view of the essential portion in FIG. 3, and FIG. 5 being a sectional view of the essential portion in FIG. 3.
Figure 4:
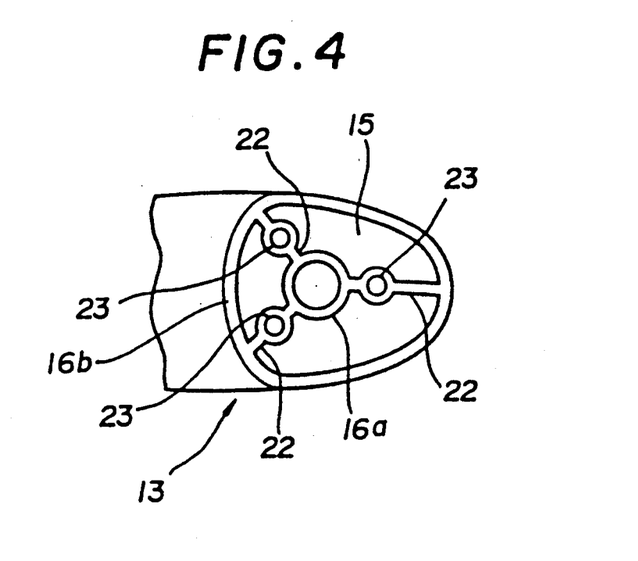
Figure 5:
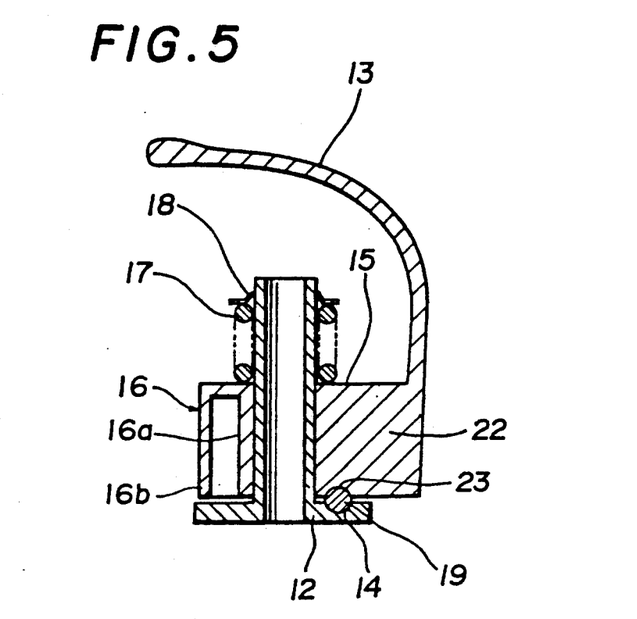

Referring now to FIGS. 3 through 5, the first embodiment of the door mirror according to the present invention will be described. In FIG. 3, the reference numeral 11 indicates a mirror base to be fixed to the door of a vehicle and to which a shaft 12 is integrally secured. The door mirror has a mirror housing 13 made of a synthetic resin and which is to be installed to a drive unit (not shown) which tiltably supports a mirror (not shown). A bearing member 16 having a bearing surface which bears the shaft 12 is integrally formed with the mirror housing 13. The bearing member 16 is composed of a hollow inner cylindrical portion 16a having formed thereon a bearing surface which bears the circumferential surface of the shaft 12, an outer cylindrical portion 16b formed surrounding the inner cylindrical portion 16a, integrally therewith and opened at the lower end thereof, and three reinforcing ribs 22 radially disposed to couple the inner cylindrical portion 16a and outer cylindrical portion 16b with each other. Each reinforcing rib 22 has formed on the bottom thereof a generally semispherical concavity 23 as shown in FIG. 3. On the other hand, the shaft 12 has formed on the base thereof three small-diameter semispherical concavities 14 correspondingly to the semispherical concavities 23. When the mirror housing 12 is in the normal position, the balls 19 are within the respecive spaces defined by the mating concavities. The length of the shaft 12 is selected to be larger than that of the inner cylindrical portion 16a so that when the shaft 12 is inserted in the inner cylindrical portion 16, it will be exposed from the upper opening. The shaft 12 has a push nut 18 fixed at the end thereof, and a compression coil spring 17 is interposed between the push nut 18 and the generally flat upper wall of the outer cylindrical portion 16b. The push nut 18 and the flat upper wall of the outer cylindrical portion 16b form together a spring receiver, and the bearing member 16 is forced toward the base of the shaft 12 under the action of the spring. When the mirror housing 13 is in the normal position, all the three balls 19 stay in the respective three concavities 14. However, when the mirror housing 13 is moved to a front or rear position with respect to the normal position, only one of the three balls 19 moves from its concavity 14 to an adjoining concavity while the other two balls 19 go out of their respective concavities 14. Thus, when the mirror housing 13 is in the normal position, it is positively positioned there by the three balls 19 and under the action of the friction due to the force of the compression coil spring 17. In this embodiment, the bearing member 16 is composed of the hollow inner cylindrical portion 16a molded integrally with the mirror housing 13 and the outer cylindrical portion 16b surrounding the inner cylindrical portion. Since both these cylindrical portions are coupled with each other by means of the plural reinforcing ribs 22, the rigidity of the bearing member as a whole can be increased and the mirror housing 13 can be positively held.

Figure 6:
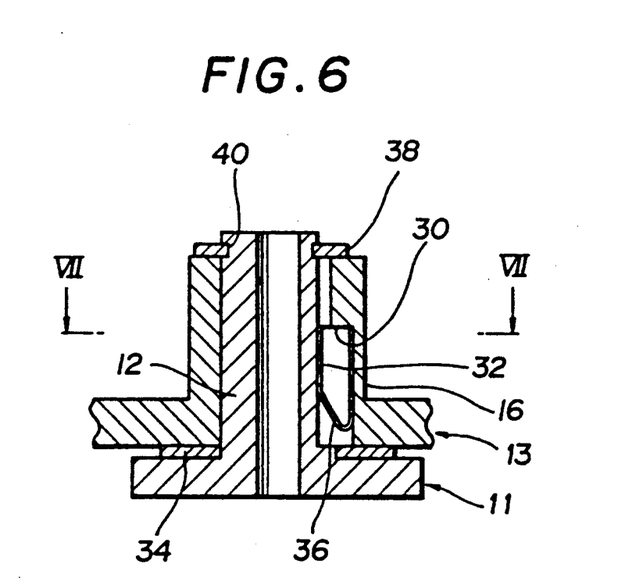
FIGS. 6 through 8 show a second embodiment of the door mirror according to the present invention; of which FIG. 6 being a sectional view of the essential portion of the door mirror, FIG. 7 being a sectional view taken along the line VII—VII and schematically showing the mirror housing supporting structure, and FIG. 8 being a sectional view for explanation of the function of the mirror housing supporting structure.
Figure 7:
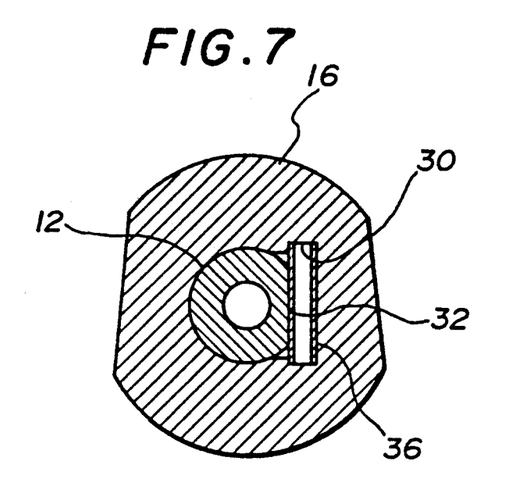
Figure 8:
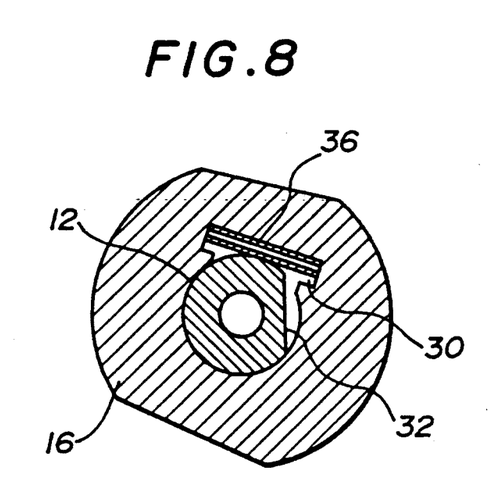

FIGS. 6 through 8 show a second embodiment. In these Figures, the same or like elements as in the first embodiment are indicated with the same or like reference numerals.

In FIG. 6, the shaft 12 is shown as separated from the mirror base 11 for the simplicity of illustration, but they are formed integrally with each other in practice. The bearing member 16 is formed integrally with the mirror housing 13. It is made in the form of a bearing having a bearing surface which bears the circumferential surface of the shaft 12. The shaft 12 has a part thereof cut into a flat surface parallel to the axis thereof as shown in FIG. 7. Namely, the part is formed to be a D-cut flat surface 32. The bearing 16 has provided therein an inner space 30 in which a U-shaped leaf spring 30 is provided. The leaf spring 36 is in contact, at the one end thereof, with the inner wall parallel to the axis and which defines the inner space 30 and at the other end with the D-cut flat surface 32. The circumferential surface of the shaft 12 abuts the bearing surface of the bearing 16 under the force of the lead spring 36. The reference numeral 34 indicates a circular friction disc interposed between the bottom of the bearing 16 and the base of the shaft 12, and the bearing 16 is held in face contact with the shaft 12 by means of the leaf spring 34 and the friction disk 36. Further, the shaft 12 has a length selected to be slightly larger than the height of the bearing 16 and has formed near the end thereof a circular recess 40 in which a cir-clip 38 is fitted. The cir-clip 38 is fitted into the recess 40 after the shaft 12 is inserted into the bearing 16, to limit the bearing 16 from moving axially. As shown in FIG. 7, when the mirror housing 13 is in the normal position, the shaft 12 is forced by a big force of the leaf spring 36 in a direction perpendicular to the axis and limited by the cir-clip 38 and friction disc 34 from moving axially, whereby the mirror housing 13 is securely held by the mirror base 11. When the mirror housing 13 is applied with a big external force, the leaf spring 36 moves from the flat surface 32 of the shaft into contact with the circumferential surface thereof while being contracted and the bottom of the bearing 16 is rotated while being in contact with the friction disc 34, so that the mirror housing 13 pivots slowly correspondingly to the direction of the external force. In this embodiment, since the construction of the conventional tiltable door mirror in which the bearing member is forced toward the base of the shaft by means of a compression coil spring is not adopted, the mirror housing supporting structure is simple, no deformation due to stress occurs and the door mirror assembly thus formed can be easily installed to the vechicle door. This embodiment has a special feature that the lead spring 36 is housed in the bearing 16 and the shaft 12 is forced against the bearing surface of the bearing 16. Namely, the shaft 12 is forced horizontally, so that the shaft 12 can be fitted into the bearing 16 by a single operation and the installion can be done without any skill. Thus, the installation of the door mirror can be automated.

Figure 9:
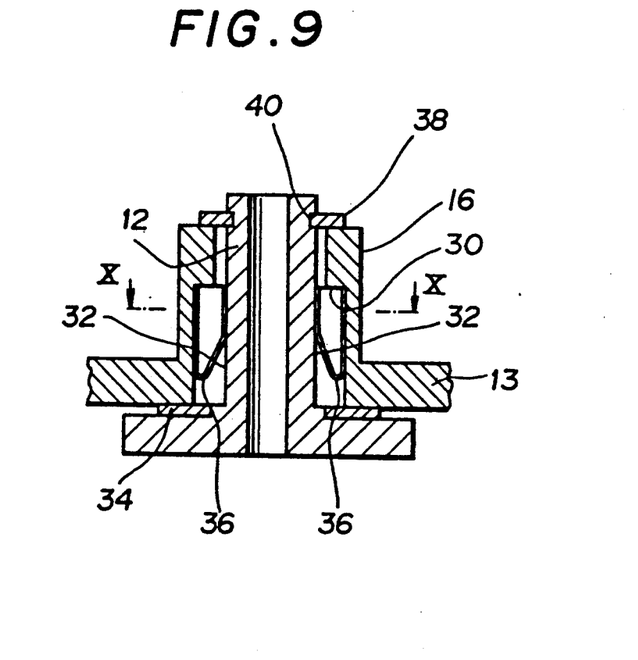
FIGS. 9 and 10 show a third embodiment of the door mirror according to the present invention; of which FIG. 9 being a sectional view of the essential portion of the door mirror showing the two leaf springs provided, and FIG. 10 being a section view taken along the line X—X in FIG. 9.
Figure 10:
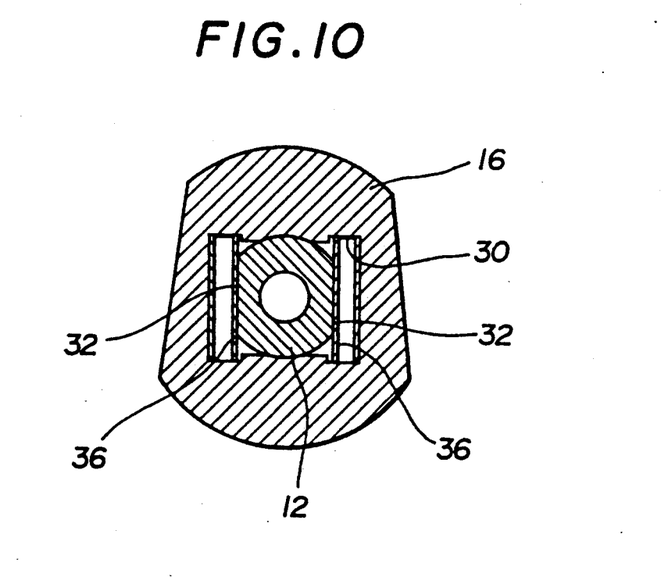
Figure 11:
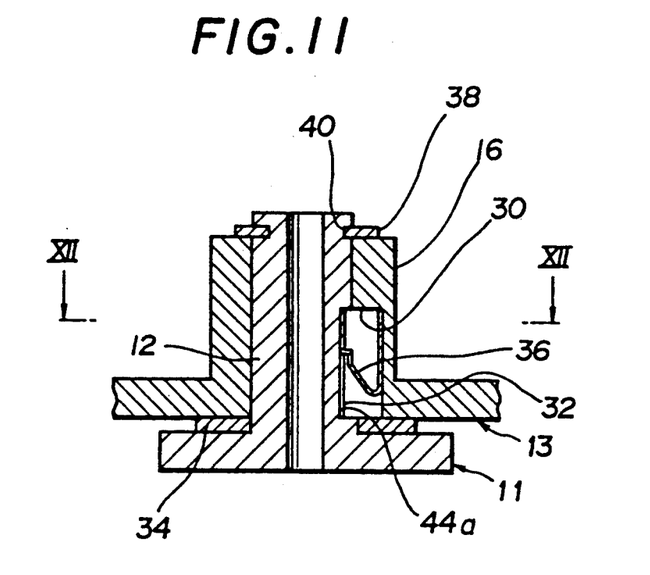
FIGS. 11 through 14 show a fourth embodiment of the door mirror according to the present invention; of which FIG. 11 being a sectional view of the door mirror, FIG. 12 being a sectional view taken along the line XII—XII in FIG. 11, FIG. 13 being a perspective view, enlarged in scale, of the form of the leaf spring, and FIG. 14 being a sectional view for explanation of the function of the mirror housing supporting structure shown in FIG. 12.

FIGS. 9 and 10 show a third embodiment in which leaf springs 36 in pair are disposed opposite to each other around the shaft 12 in the space 30 defined in the bearing 16. The circumferential surface of the shaft 12 is partially formed as flat surfaces, namely, D-cut flat surfaces, with which the leaf springs 36 in pair are in contact, respectively, the remainder of the circumferential surface being in contact with the bearing surface of the bearing 16. In this embodiment, since the two flat surfaces are forced in the opposite directions by the leaf springs 36, respectively, the mirror housing 12, when in the normal position as shown in FIG. 10, can be more positively held by the shaft 12, namely, by the mirror base, than in case a single leaf spring 36 is used. Namely, only when a larger external force is applied to the mirror housing 13 than in case the single leaf spring 36 is used, the mirror housing 13 is slowly pivoted.

Figure 12:
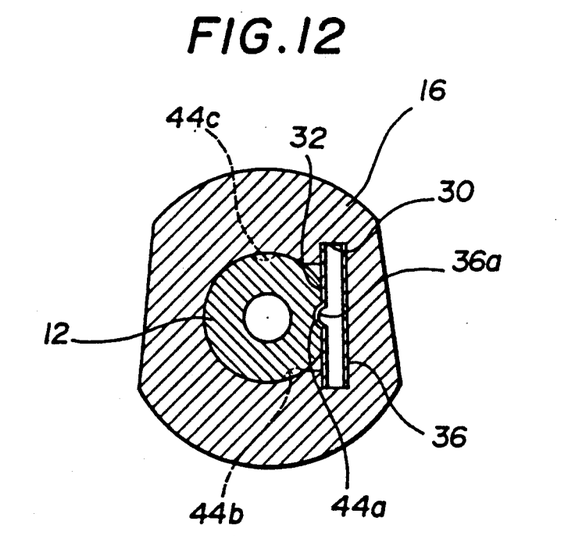
Figure 13:
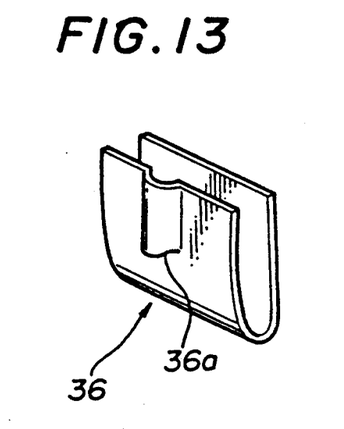
Figure 14:
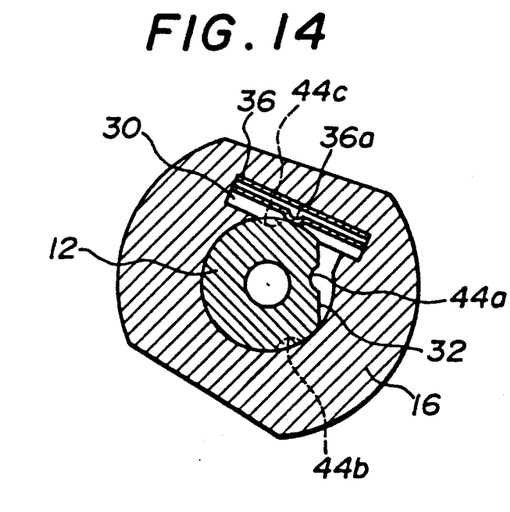

FIGS. 11 through 14 show a fourth embodiment. In this embodiment, a single leaf spring 36 is used as in the second embodiment, but as shown, as enlarged in scale, in FIG. 13, the leaf spring 36 has the one end thereof formed as a flat surface so as to be in contact with the inner wall of the bearing 16 which defines the housing space 30 and the other end of the leaf spring 36 has formed as a protrusion 36a a part of the flat surface which is in contact with the D-cut flat surface 32 of the shaft 12. On the other hand, the D-cut flat surface 32 of the shaft 12 has formed thereon a concavity 44a in which the protrusion 36a is engaged. Therefore, since the shaft 12 is formed against the bearing surface of the bearing 16 with the protrusion 36a of the leaf spring 36 engaged in the concavity 44a of the shaft 12 when the mirror housing 13 is in the normal position as shown in FIG. 12, the friction between the bearing 16 and shaft 12 provides a positive holding of the mirror housing 12 with respect to the mirror base 11. If the mirror housing 13 is applied with a big external force, for example, in case the mirror housing 13 is turned frontward or rearward to avoid any obstacle, for example, when the vehicle is driven in a narrow place, the protrusion 36a of the leaf spring 36 and the concavity 44a in the shaft 12 are disengaged from each other and the bearing 16 is slowly pivoted with the protrusion 36a being in contact with the circumferential surface of the shaft 12. At this time, the leaf spring 36 is pivoted while being contracted. In case the mirror housing 13 is returned to the initial normal position from the turned position, it is automatically positioned by pivoting it in an opposite direction until the protrusion 36a is engaged into the concavity 44a in the shaft 12. As shown with dot line in FIGS. 12 and 14, other concavities 44b and 44c may be formed, in addition to the concavity 44a, in the circumferential surface of the shaft 12 corresponding to the path of the protrusion 36a. The concavities 44b and 44c should preferably be formed correspondingly to the front and rear positions with respect to the normal position of the mirror housing 13 so that when the mirror housing 13 is applied with a big external force, it is stopped at either of such positions from pivoting.

Figure 15:
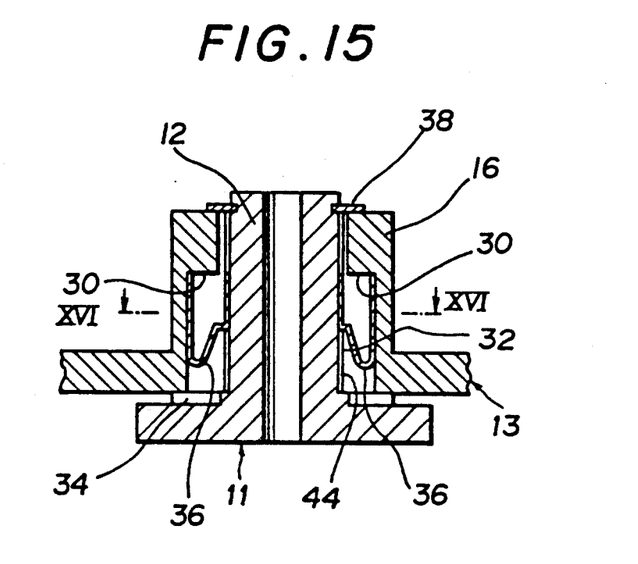
FIGS. 15 and 16 show a fifth embodiment of the door mirror according to the present invention; of which FIG. 15 being a sectional view showing the essential portion of the door mirror, and FIG. 16 being a sectional view taken along the line XVI—XVI in FIG. 15.
Figure 16:
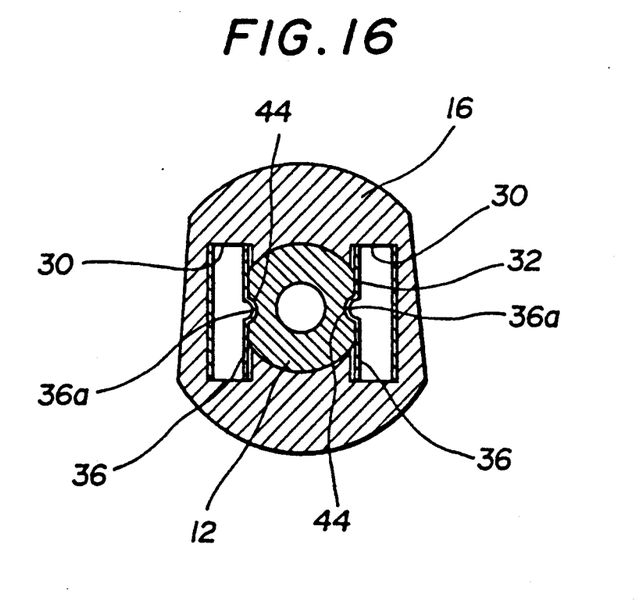

FIGS. 15 and 16 show a fifth embodiment in which two leaf springs 36 each having the protrusion 36a as shown in the fourth embodiment are housed around the shaft 12 in the bearing 16. The circumferential surface of the shaft 12 is partially formed into two D-cut flat surfaces 32 parallel t each other on which concavities 44 are formed, respectively, in which the two protrusions 36 of the leaf springs 36 are engaged, respectively. The concavity 44 takes the form of an elongated recess formed to a length corresponding to the length of the shaft 12 and axially of the shaft 12. However, the concavity is not limited only to the above, but it may be a one having such a width and length that the protrusion 36a can be engaged in it. Since the mirror housing supporting structure in this embodiment can provide a rotation torque nearly double that in the fourth embodiment, the mirror housing 13 can be more securely held with respect to the mirror base 11.

Figure 17:
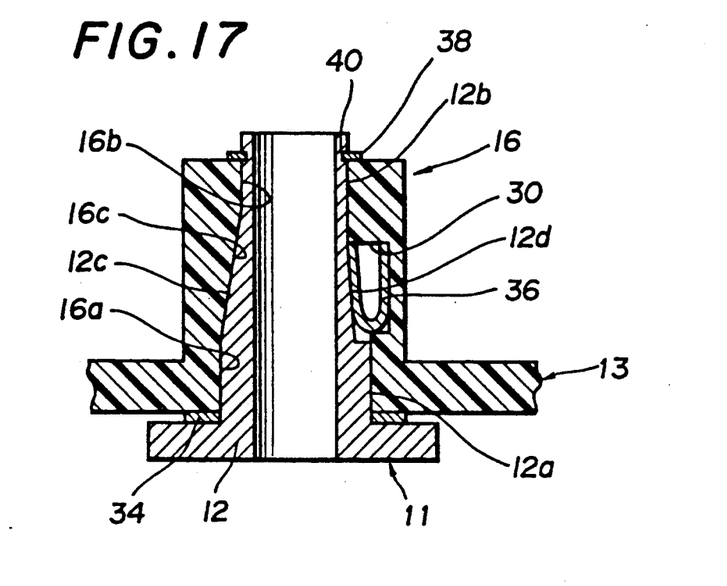
FIGS. 17 and 18 show a sixth embodiment of the door mirror according to the present invention; of which FIG. 17 being a sectional view of the essential portion showing the mirror housing supporting structure of the door mirror, and FIG. 18 being a schematic perspective exploded view of the mirror housing supporting structure shown in FIG. 17.
Figure 18:
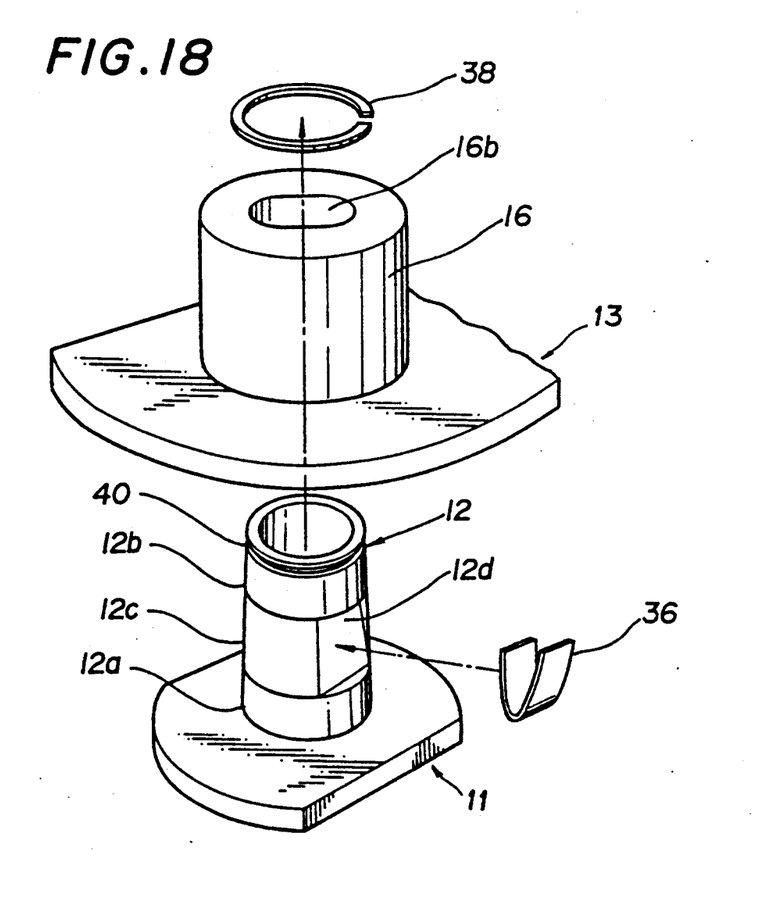

FIGS. 17 and 18 show a sixth embodiment in which the shaft 12 has a circumferential surface composed of a large-diameter cylindrical surface 12a rising from the base which is to be secured to the mirror base 11, a small-diameter cylindrical surface 12b located near the end of the shaft 12 and a conical surface 13c contiguous to the large-diameter cylindrical surface 12a and small-diameter cylindrical surface 12b. Also the inner surface of the bearing 16 is composed of a large-diameter bearing surface 16a fitting the circumferential surface of the shaft 12, a small-diameter bearing surface 16b and a conical bearing surface 16c contiguous to the large-diameter bearing surface 16a and small-diameter bearing surface 16b. A part of the conical surface 12c is formed into a flat surface 12d parallel to the generating line of the conical surface 12c. When the mirror housing 12 is in the normal position, the leaf spring 36 is in contact at the end of thereof with the flat surface 12d and at the other end with the nearly vertical inner wall of the bearing 16. Since the leaf spring 36 is in contact at the one end thereof with the nearly vertical flat surface and at the other end with the flat surface parallel to the generating line of the conical surface, the bearing 16 is applied with a force which pushes up the shaft 12 obliquely, but the cir-clip 38 secured to the end of the shaft restains the bearing 16 from being moved under such force.

In this embodiment, the large-diameter cylindrical surface 12a rising from the base of the shaft 12 and the small-diameter cylindrical surface 12b located near the shaft end are both directed axially, and also the bearing surfaces 16a and 16b adjoining the upper and lower openings, respectively, of the bearing 16 are both directed axially, so that the shaft 12 is in close contact with the bearing 16. The shaft 12 can be easily fitted into the bearing 16 by housing the leaf spring 36 within the housing space 30 in the bearing 16 beforehand, then inserting the end of the shaft 12 into the bearing 16 from the lower opening thereof.

Figure 19:
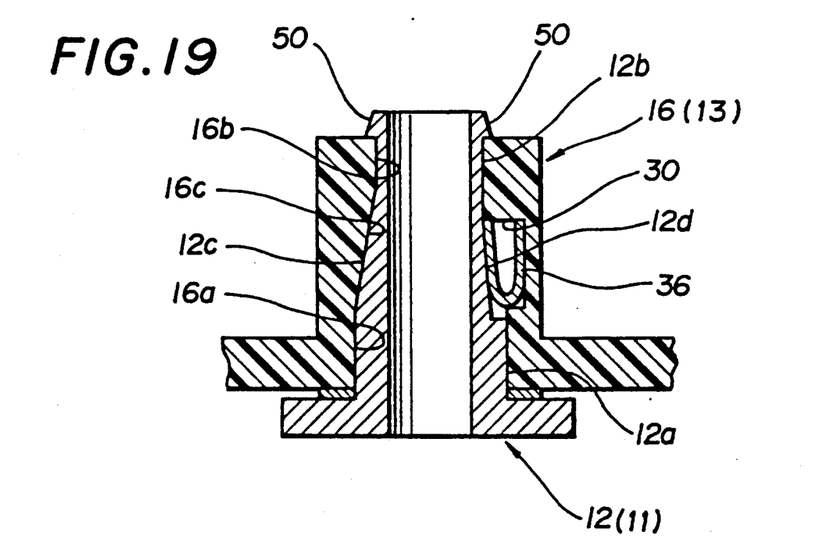
FIGS. 19 and 20 show a seventh embodiment of the door mirror according to the present invention, of which FIG. 19 being a sectional view of the essential portion showing the mirror housing supporting structure of the door mirror, and FIG. 20 being a schematic perspective exploded view of the mirror housing supporting structure shown in FIG. 19.
Figure 20:
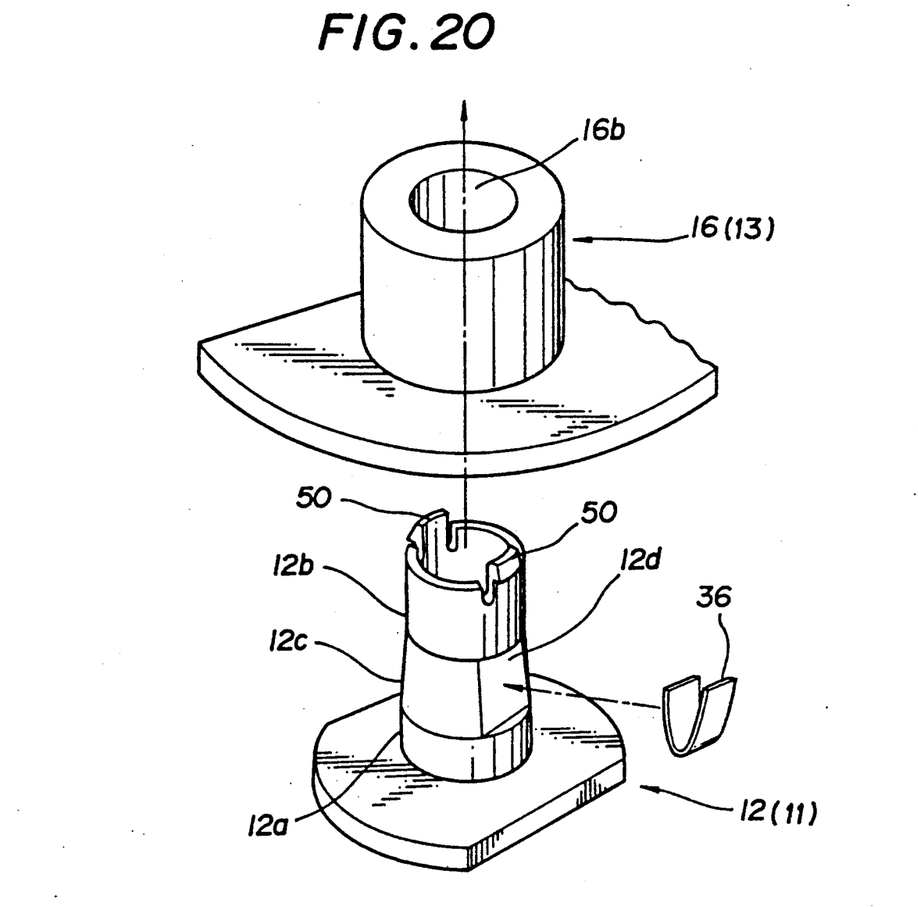

FIGS. 19 and 20 show a seventh embodiment in which a pair of pawl pieces 50 is provided at the end of the shaft 12 as a variant of the cir-clip 38 in the sixth embodiment. These pawl pieces 50 are formed integrally with the shaft 12 by an integral molding. Each of the pawl pieces 50 is inserted in the bearing 16 and when the end of the pawl piece 50 passes by the upper opening of the bearing 16, it is pushed inwardly by the cylindrical bearing surface 16b. After it passes by the upper opening of the bearing 16, it is engaged on the edge of the upper opening of the bearing 16. To this end, either side of each pawl piece 50 has an axial cut formed therein to have some elasticity. In this embodiment, a pair of pawl pieces 50 is provided; however, this number of pawl pieces is not limited to a pair but three or four pawl pieces may be used. The feature of the embodiment lies in that since the mirror housing supporting structure is extremely simplified, it is possible to install the shaft 12 into the bearing 16 very rapidly and easily.

Figure 21:
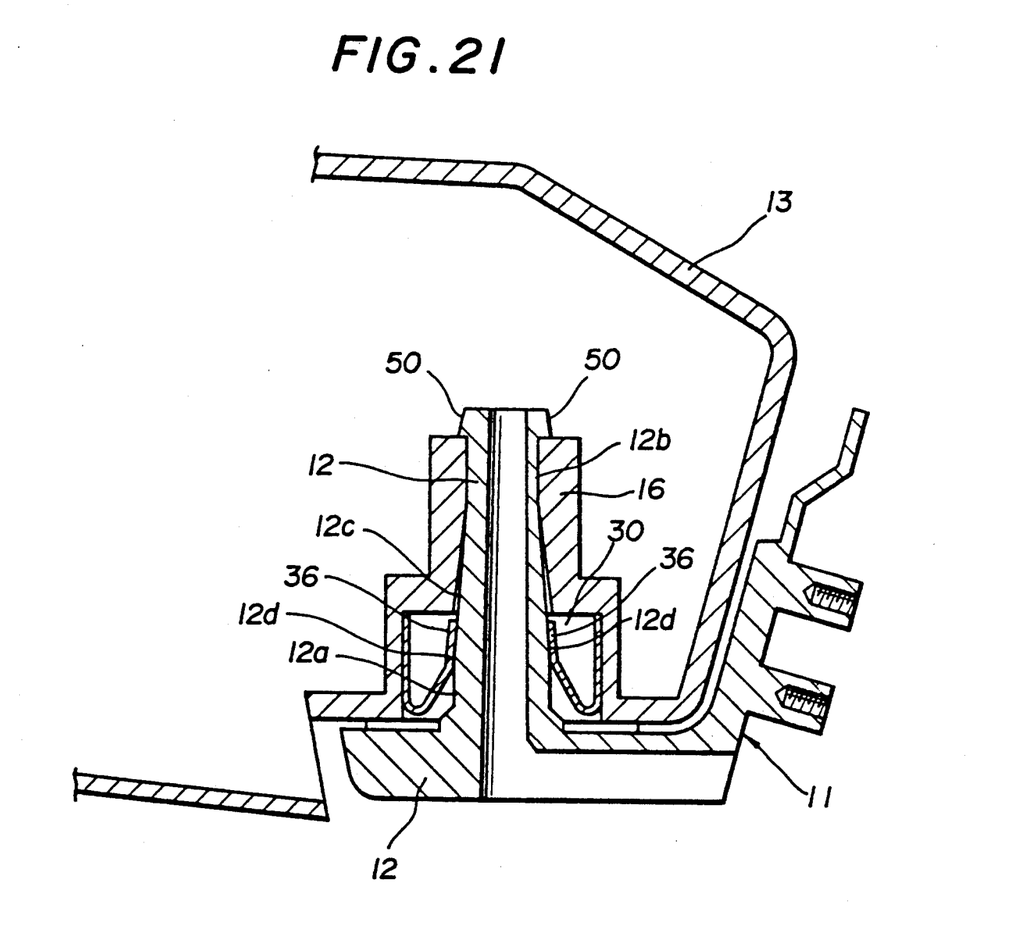
FIG. 21 is a sectional view of the essential portion of the door mirror showing an eighth embodiment of the door mirror according to the present invention.

FIG. 21 shows an eighth embodiment in which two pieces of leaf springs 36 in the seventh embodiment. The housing spaces in which these two leaf springs 36 are disposed are located opposite to each other around the shaft 12. In this embodiment, the lower opening of the bearing 16 defines the housing space 30. Each leaf spring 36 is in contact at the one end thereof with the flat surface 12d formed on the conical surface 12c of the shaft 12 and at the other end with the nearly vertical inner surface of the bearing 16, whereby the mirror housing 12 can be securely held in the normal position and can withstand a high wind pressure.

Figure 22:
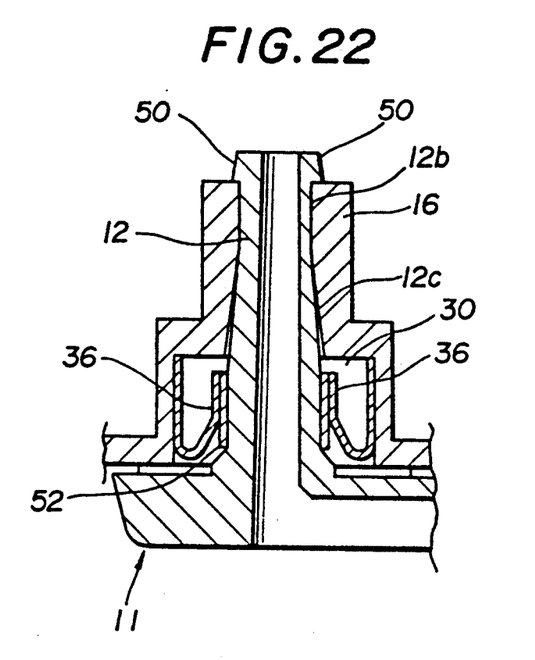
FIG. 22 is a sectional view of the essential portion showing a variant in which a friction-preventive ring is provided between the pair of leaf springs and the shaft in FIG. 21.
Figure 23:
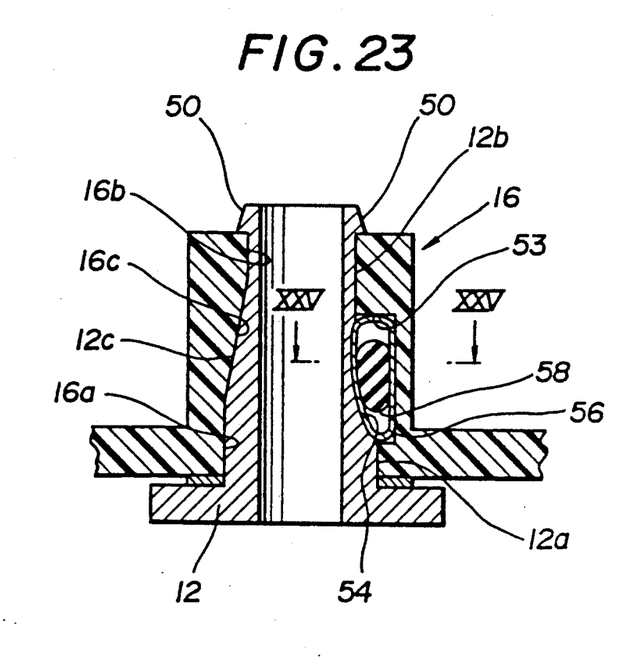
FIGS. 23 through 26 show a ninth embodiment of the door mirror according to the present invention, of which FIG. 23 being a sectional view of the essential portion of the door mirror, FIG. 24 being a schematic perspective exploded view of the mirror housing supporting structure shown in FIG. 23, FIG. 25 being a sectional view taken along the line XXV—XXV in FIG. 23, and FIG. and 26 being a sectional view for explanation of the action of the elastic member surrounded by the lubricating synthetic resin shown in FIG. 25.
Figure 24:
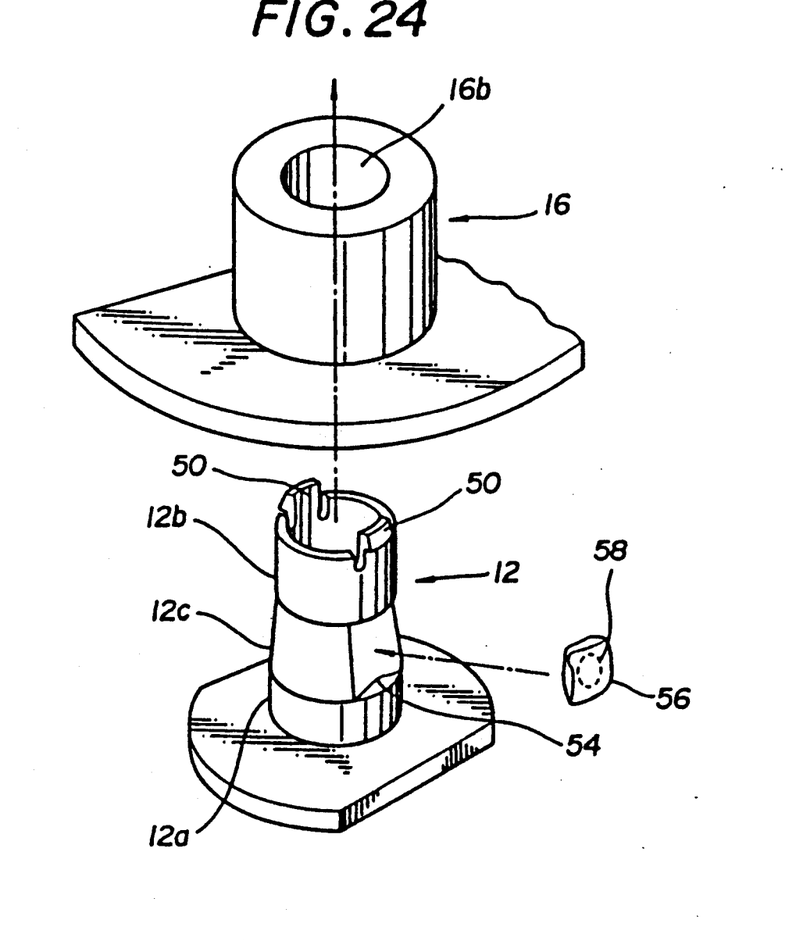

As shown in FIG. 22, flat surfaces 12d in pair are formed opposite to each other on the large-diameter cylindrical surface 12a of the shaft and a metallic ring 52 is disposed surrounding the large-diameter cylindrical surface 12a. Therefore, the pair of leaf springs 36 will force the shaft by means of the metallic ring 52, whereby it is possible to reduce the abrasion due to the friction between the shaft 12 and leaf springs 36.

Figure 25:
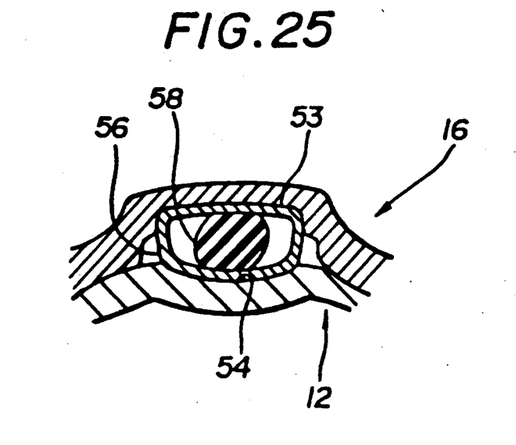
Figure 26:
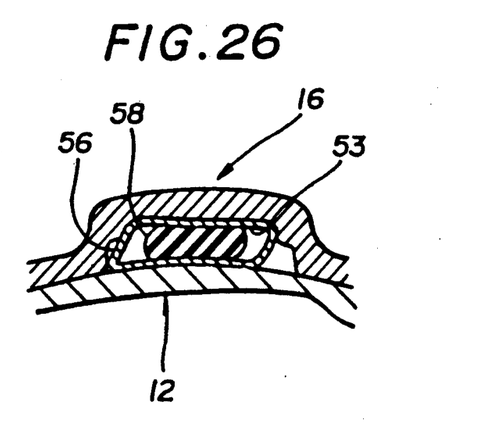

FIGS. 23 through 26 show a ninth embodiment in which an elastic member 58 wrapped with a lubricating synthetic resin 56 is used as the spring means in place of the leaf spring 36 in the seventh embodiment. For housing the elastic member 58 wrapped with the lubricating synthetic resin 56, a concavity 54 is formed in a part of the conical surface 12c of the shaft 12 and also there is formed a concavity 53 inside the bearing 16 in a position opposite to the concavity 54, namely, a concavity corresponding to the housing space for the leaf spring 36 in the seventh embodiment, these concavities 54 and 53 defining a pocket area. The elastic member 58 is formed by a ball made of a silicon synthetic resin As the lubricating synthetic resin 56, polyoxyethylene, for example, is selected. The elastic member 58 disposed as housed in the pocket area and wrapped with the lubricating synthetic resin 56 takes a somewhat crushed form as shown in FIG. 25 and forces the concavities 53 and 54, when the mirror housing 13 is in the normal position. When the bearing 16 is pivoted about the shaft 12, the elastic member 58 wrapped with the lubricating synthetic resin 56 is moved as deformed within the small space defined by the conical surface 12c of the shaft 12 and the concavity 53 in the bearing 16, takes a flat form as shown in FIG. 26 and will force the shaft 12 with a larger elasticity. Therefore, when the bearing 16, namely, the mirror housing 13, is in the normal position, the shaft 12 is held in the normal position as forced against the bearing surface of the bearing 16 with a predetermined elasticity. For pivoting the mirror housing 13 from the normal position to a front or rear position with respect to the normal position, the mirror housing 13 must be applied with a larger external force. In this embodiment, since an elastic member made of a silicon synthetic resin or the like as the spring means is wrapped with the lubricating synthetic resin 56, the mirror housing 14 can be pivoted calmly and will not be worn out early. In this embodiment, the shape of the elastic member 58 takes the form of a ball before crushed, but as obvious to those skilled in the art, the shape may be oval or any other one which has a curved surface similar to the ball.

What is claimed is:

1. A door mirror for vehicles having a mirror base to be fixed to the door of a vehicle and which has a substantially vertical shaft, a synthetic resin-made mirror housing tiltably supporting a mirror and pivotably supported on said shaft, and spring means for biasing the mirror housing toward the mirror base to maintain the mirror housing in a normal position, said mirror housing being pivotable from the normal position to a front or rear position with respect to the normal position when applied with an external force larger than a predetermined force corresponding to the elasticity of said spring means, said mirror housing having formed by an integral molding therein a bearing member which bears the shaft of said mirror base, wherein said bearing member is composed of a hollow inner cylindrical portion having formed thereon a bearing surface to bear the circumferential surface of said shaft, an outer cylindrical portion formed integrally with said inner cylindrical portion and opened at the lower end thereof, and a plurality of reinforcing ribs coupling said inner and outer cylindrical portions to each other and disposed radially, an end of said shaft being so constructed as to be inserted from a lower opening of said inner cylindrical portion and exposed outside of an upper opening thereof, an upper wall of said outer cylindrical portion being formed to have a flat surface substantially perpendicular to said shaft, said spring means being constructed in the form of a compression coil spring interposed between a spring receiving member fixed at the end of said shaft end and said flat surface.

2. The door mirror for vehicles according to claim 1, wherein there is interposed between said mirror housing and said mirror base spherical members pivotably supporting said mirror housing around said shaft, said spherical members including three balls disposed in spaces defined by three small semispherical concavities formed on said mirror base and three essentially semispherical concavities formed concentrically at ends of respective reinforcing ribs, the small semispherical concavities on said mirror base being provided corresponding to the normal position of said mirror housing and to front and rear positions with respect to the normal position.

3. The door mirror for vehicles according to claim 1, wherein said shaft is formed integrally with said mirror base.

4. A door mirror for vehicles comprising:
(A) a mirror base fixed to the door and having a substantially vertical shaft;
(B) a mirror housing, made of a synthetic resin, which tiltably supports a mirror and which is pivotally supported on a substantially vertical shaft of said mirror base, said mirror housing having a bearing member integrally molded therein which bears said shaft, said bearing member comprising a hollow cylindrical inner portion having formed thereon a bearing surface which bears the circumferential surface of said shaft, a cylindrical outer portion formed integrally with said inner portion and opened at a lower end thereof, and a plurality of radially extending reinforcing ribs coupling said inner and outer portions to each other; and
(C) spring means for biasing said mirror housing towards said mirror base to maintain said mirror housing in a normal position, said mirror housing being pivotable from the normal position to front and rear positions with respect to the normal position when applied with an external force larger than a force corresponding to the elasticity of said spring means.

5. The door mirror for vehicles according to claim 4, further comprising spherical members, interposed between said mirror housing and said mirror base, which pivotally support said mirror housing around said shaft, said spherical members comprising three balls disposed in spaces defined by three semispherical concavities formed on said mirror base and by three essentially spherical concavities formed concentrically at ends of respective reinforcing ribs, wherein the semispherical concavities are provided on said mirror base in locations corresponding to the normal position of said mirror housing and to front and rear positions with respect to the normal position.

* * * * *